May 23, 1961 B. E. SHAW ET AL 2,985,094
COOKING APPARATUS
Filed Nov. 9, 1959 2 Sheets-Sheet 1
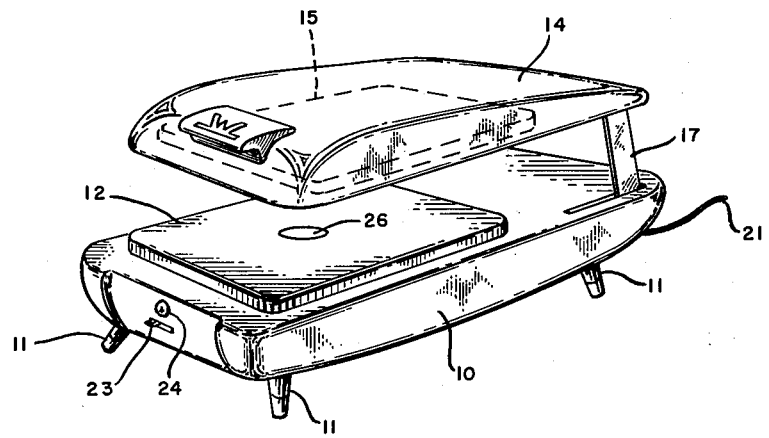
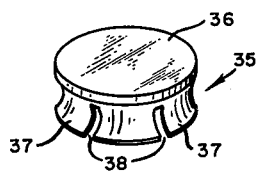
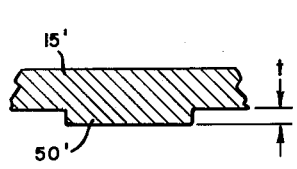
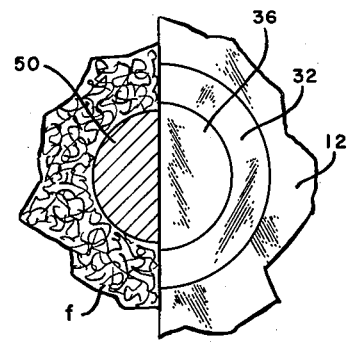
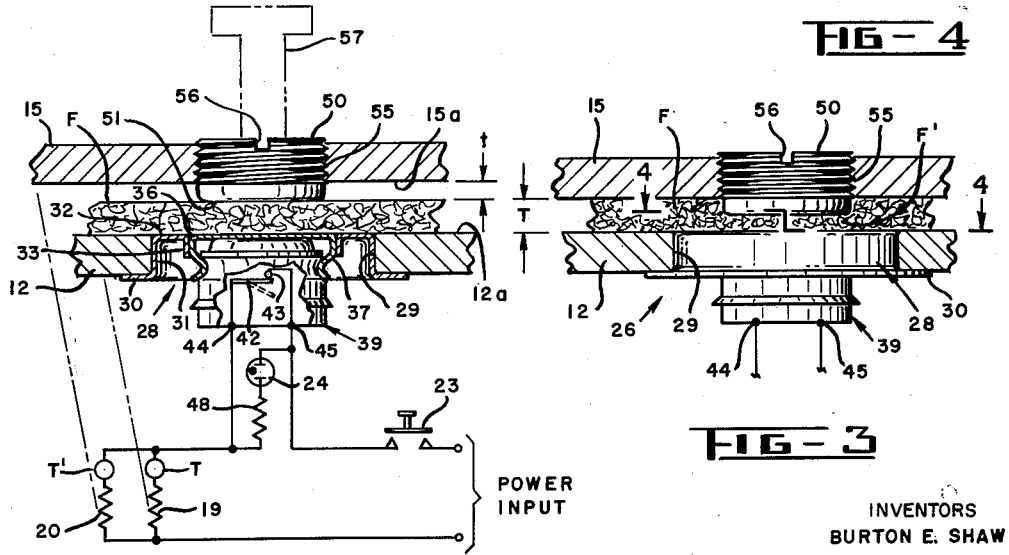
INVENTORS
BURTON E. SHAW
ROGER K. LEE JR.
BY *J. Chignard*
ATTORNEY INVENTORS
BURTON E. SHAW
ROGER K. LEE JR.
BY J. Chopnant
ATTORNEY

United States Patent Office 2,985,094
Patented May 23, 1961

2,985,094
COOKING APPARATUS
Burton E. Shaw, Cambridge, and Roger K. Lee, Jr., Watertown, Mass., assignors to Electronics Corporation of America, Cambridge, Mass., a corporation of Massachusetts
Filed Nov. 9, 1959, Ser. No. 851,797
9 Claims. (Cl. 99—331)

This invention relates to cooking apparatus and more particularly to an electric grill of the type having upper and lower heating plates between which food to be heated or cooked is placed.

A desirable feature in this type of cooking apparatus is means for indicating when the food being heated has reached the proper temperature for serving. Timers have been used for this purpose but have had only limited application because the time required properly to heat foods depends on several variables, for example, the kind of food, its thickness, and, important in the case of frozen foods, its temperature prior to heating. Other controls have been proposed which depend upon heat sensitive devices, such as bi-metallic strips, which are responsive to the temperature of the heating units in the cooking device. An example of the latter type of control is that described in Patent No. 2,710,906 issued to M. L. Lipsich, et al. Such devices, in sensing the temperature of heat transmitting plate, are responsive, at most, to the temperature of that portion of food immediately adjacent to the plate which may differ substantially from the temperature of those parts of food spaced further from the plate. This deficiency is especially pronounced in the case of frozen foods which thaw from the outside to the center of the food.

In accordance with this invention, a detector assembly with a temperature responsive element is integrated into one of the heat transmitting plates of the grill and is positioned so as to be in direct contact with the food to be heated. This element is responsive to heat transmitted through the food charge above the element and turns on an indicator light when a predetermined temperature is reached. The element, which preferably is a bi-metallic strip or disc, is insulated from the plate in which it is mounted by an annular heat shield while the heat transfer path between the element and the food is a highly conductive one.

Cooperating with the detector device in the one plate is a heat conductive plug mounted in the other plate and adapted to be in direct vertical alignment with the bi-metal element when both plates are in the operative position, that is, closely spaced to each other. In one arrangement the plug is mounted on the upper plate and the detector assembly in the lower plate. The plug projects below the surface of the upper plate so that it is closer to the upper surface of the detector device than the plates are to each other. The plug transmits heat through the portion of the food charge in line with the detector device, and so this part of the charge must be heated all the way through in order that sufficient heat shall reach the temperature responsive element to actuate it. By adjustment of the distance which the plug projects from the upper plate, control of the depth of heating of the thicker food charge between the plates is afforded. Alternatively, the plug may be fixed relative to the upper plate when such adjustment is not required by the conditions under which the grill is used. Adjustment of the heat responsive element permits control of the desired temperature of the food. Thorough heating of the food from the outside inwardly is thus achieved in a controlled manner so that a predetermined serving temperature is not exceeded. A separate limit thermostat is associated with each plate for maintaining the plate at a predetermined operating temperature. A primary object of the invention is the provisions of food heating and cooking apparatus having detector means for automatically indicating when a food charge has been fully heated to serving temperature.

Another object is the provision of a two-plate grill with means for indicating when the central part of the food being grilled has been heated to a predetermined temperature.

A further object is the provision of grill-type electric cooking apparatus with an adjustable thermal control to permit complete through-heating of food charges of varying thickness, varying specific heats, and different initial temperatures.

Still another object is the provision of a grill heater that quickly and thoroughly thaws and warms frozen food charges such as beef patties, pre-cooked waffles, and the like.

Another object is the provision of a unidirectional heating system for controlling the operation of a bi-directional heating mechanism.

Still another object is the provision of a compact inexpensive, reliable and rugged temperature control for electric grills.

These and other objects of our invention will become apparent from a reading of the following description of a preferred embodiment thereof, reference being had to the accompanying drawings in which:

Figure 1 is a perspective view of a dual plate electric grill of the type with which our invention may be practiced;

Figure 2 is an enlarged central section of part of a two-plate grill and food charge therein, and showing in partially schematic representation of a temperature indicating system embodying this invention. In this figure, the upper plate is shown spaced from the food;

Figure 2–A is a perspective view of a retainer cup forming part of the thermostat assembly.

Figure 3 is a central section similar to Figure 2 showing the upper plate in full engagement with the food charge;

Figure 3–A is a section of part of a modified top plate in which the plug part is formed integrally with the plate.

Figure 8:
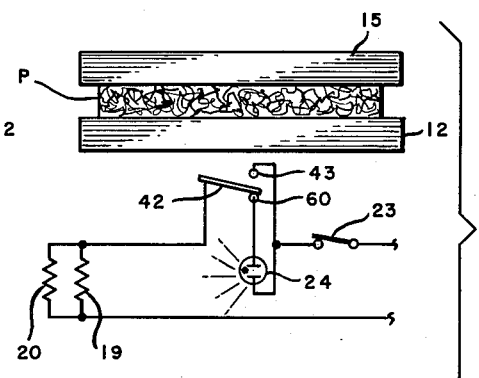
Figure 9:
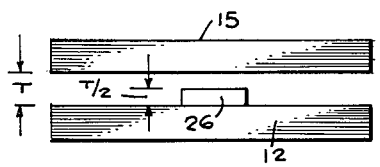
Figure 10:
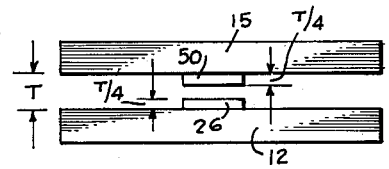

Figure 4 is a section taken on line 4—4 of Figure 3;

Figures 5 to 8, inclusive, are schematic drawings illustrating in sequence the positions of the parts of the grill and the operation of the control during a cycle of heating a food specimen to serving temperature; and Figures 9 and 10 are schematic drawings of the heating plates showing alternate arrangements of the plug and thermostat assemblies.

Referring now to the drawings, Figure 1 shows one type of electric grill with which our invention is practiced, the grill comprising a lower unit or base 10 supported on suitable legs 11 and having heating plate 12 fixed on the top part of the base. The upper unit 14 of the grill carries a corresponding heating plate 15, and is supported for movement relative to the lower unit 10 by hinge bars 17 pivotally mounted to and interconnecting the rear parts of these units. These hinge bars are designed to permit the upper unit to be moved from the fully opened position shown, wherein the upper unit is spaced vertically a maximum distance from and is offset slightly to the rear of the lower unit, to a fully closed position with the heating plates aligned and in contact with an interposed slab of food. During a substantial portion of this closing movement, the heating plates are vertically aligned, the hinge bars being so arranged that the upper unit moves in a direction normal to the plane of the lower heating plate. This assures proper operation of the temperature indicating system for indicating when the food charge has been fully heated, as will be explained below.

Both the upper and lower units 10 and 14 of the grill contain heating elements 19 and 20, shown schematically in Figures 2 and 5 to 8, inclusive, mounted in good heat exchange relation to plates 12 and 15, as suggested by the dot dash lines. These heaters are energized by a power source through cable 21 by actuation of an on-off switch 23 conveniently mounted in the front of the lower unit. Immediately above this switch in full view of the user is an indicator lamp 24 which glows when the food in the grill is fully heated. Heaters 19 and 20 have thermostats T and T', respectively, which control energization of the heaters so as to maintain plates 12 and 15 at predetermined operating temperatures.

In order to sense the temperature of the food and to indicate that it has been thoroughly heated to a predetermined temperature, we have provided a temperature detector assembly 26 mounted in the heater plate 12 of the lower grill unit. As shown in Figure 2, this assembly comprises an annular shield member 28 secured and sealed in a cylindrical opening 29 in heater plate 12. Member 28 is formed with a lower radial flange 30 which extends under the plate 12 and tightly against the marginal portions of its lower surface, a cylindrical body portion 31 covering the wall surface of the opening 29, and a top inwardly extending radial flange 32 lying substantially in the plane of the top surface 12a of plate 12 and terminating in a downwardly extending annular lip 33. This member 28 is designed to shield the bi-metallic element of the detector from heat radiating from plate 12 and accordingly is made of a material which has a relatively low thermal conductivity, such as stainless steel.

Mounted within shield member 28 is an inverted cup-like retainer 35 having a top wall 36 lying flush with top surface 12a of plate 12 and secured and sealed along a minimum area of contact to lip 33 of member 28 as by brazing. The small area of contact between these parts minimizes heat transfer between them. Depending from and integral with top wall 36 are a plurality of spring fingers 37, see Figure 2–A, separated by slots 38 for resiliently retaining the thermostat assembly 39 in proper position for sensing food temperature. The junctions of cup 35 to shield 28 and of the latter to plate 12 are impervious to moisture and the like so that no fluids or vapors from foods heated in the grill can penetrate below the surface of the bottom plate which is therefore, effectively, continuous. Cup 35 is made of material having high heat conductivity such as beryllium copper.

Thermostat assembly 39 comprises a housing 40 removably supported by retainer fingers 37 in full contact with retainer top wall 36. Suitably mounted within this housing is a heat-sensitive element 42 such as a bi-metallic strip, which breaks connection with contact 43, as suggested in broken line, and opens an electrical circuit connecting thermostat terminals 44 and 45 in response to heat transmitted to the element through the retainer top wall 36. It is important to note that the thermostat assembly is effectively insulated from heat radiating from lower plate 12 by shield member 29 and by the annular air space between member 29 and fingers 37. Element 42, therefore, responds substantially exclusively to heat directed vertically downward, as viewed, through the retainer top wall 36. This arrangement permits operation of the temperature indicating system in direct response to the temperature of the food being heated.

Thermostat terminals 44 and 45 are connected in series with the power input circuit for heater coils 19 and 20. Neon indicator lamp 24 together with resistor 48 are connected in parallel across element 42 so that the lamp will glow when that element breaks its connection with contact 43. The thermostat may be adjustable so that the element 42 can be made to open at selected temperatures thereby providing a range of food temperatures at which the indicator 24 will operate.

The food heating capability of the grill directly above the temperature detector assembly 26 is substantially diminished because of the hole 29 in the lower heater plate 12 in which the assembly is mounted. In order to compensate for this loss, the upper plate 15 is provided with a plug 50 of heat conducting material which projects below the surface 15a of the plate. This plug, which may either be fixed or adjustable, is arranged to be vertically aligned with detector assembly 26 so that the space between the heat radiating surface 51 of the plug and the top wall 36 of retainer 35 is substantially less than the space between plates 12 and 15. Thus the heat path through food charge F is less above the detector assembly 26 than at other places on the grill and compensation for the hole 29 in the lower plate is effected.

The distance $t$ which plug 50 projects from plate 15 is a measure of the depth of heating of the food charge F by the remaining areas of plates 12 and 15. To explain this more fully, assume that heating of the food charge begins with the parts in the position shown in Figure 3. In order for the temperature responsive element 42 to react as described, heat from plug 50 must penetrate food having an effective thickness equal to the total thickness T of the charge less the projecting distance $t$ of the plug. While heat is working down through the reduced portion F' of food from the plug to the element 42, plates 12 and 15 are simultaneously heating the charge from the outside inwardly. If plug 50 is set to project a distance $t$ equal to one-half the thickness T of the charge, then the temperature at the central plane of the charge midway between the heating plates will rise at the same rate as the outside temperature of the portion F' in contact with thermostat top wall 36. Assuming that all parts of the food are initially at the same temperature, the central part of the charge and that part of the charge directly contacting wall 36 will be at the same temperature. Thus element 42, in responding to the temperature at wall 36 indicates when the mid-section of the food charge has reached the predetermined serving temperature.

It should be noted that this indicator system responds to the flow of heat through the food charge to indicate the depth of heating of the entire charge. As a result, the system automatically compensates for foods having different specific heats (requiring varying amounts of heat to elevate them to serving temperature) or foods having different initial or pre-heat temperatures, such as frozen foods. The time required properly to heat such diverse foods may vary but the indicator will tell the ultimate condition of when the food charge has been completely heated to the predetermined serving temperature.

Since the distance $t$ which plug 50 projects from top plate 15 determines the depth of heating of the food charge, it may well be preferred that the plug be adjustable so that the grill may readily accommodate foods having substantially different thicknesses. To this end plug 50 may be threaded into a suitable opening 55 in the top plate, and may either be slotted at 56 to receive an adjusting tool or may have a stem 57, shown in broken line. If, however, the grill is used exclusively for heating food charges having substantially uniform thicknesses, such as, for example, the heating of frozen pre-cooked hamburger patties at stands specializing in hamburgers, then the plug need not be adjustable and may be formed integrally with the top plate as indicated at 50' in Figure 3–A, with the projecting distance $t$ of the integral plug being one-half the thickness T of the charge.

In order that the invention herein described shall be fully understood, the operation of the grill will be described in connection with heating a piece of frozen food, such as meat patty. The grill preferably is brought up to warming temperature before the patty is positioned on it, and this is accomplished by closing switch 23 which connects plate heaters 19 and 20 to the power source through the bi-metallic element 42, see Figure 5. For the purpose of clearly illustrating the function of element 42, neon lamp 24 is shown as having a stationary contact 60 which is adapted to be engaged by element 42 for energizing the lamp. After the plates have warmed, the grill is ready for the heating operation. Plug 50 is also heated during the warm-up period.

Figure 6:
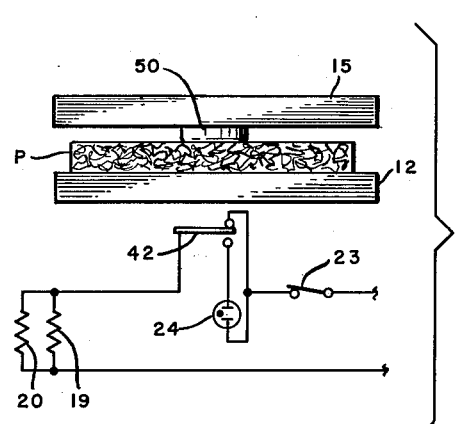
Figure 7:
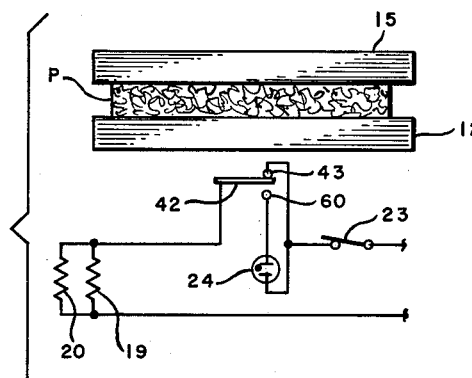

A frozen patty P is then positioned on the lower plate 12 as shown in Figure 6 and top plate 15 is moved down from its full open position until plug 50 firmly contacts the top of the charge. Since the charge is in the frozen state, plug 50 does not initially penetrate it but does bear against a limited area under the full weight of the top plate 15 which is spaced from the patty during this part of the cycle. Under this pressure of the heated plug, the portion of the patty immediately adjacent to and under the plug thaws and softens sufficiently to allow the entire plate 15 to ultimately bear against the top of the food, see Figure 7. It will be noted that during that step the patty is pressed firmly against the top wall 36 of the thermostat assembly thereby assuring good thermal contact between these parts.

The portion of the patty between the plug and the thermostat is in substantially the same frozen state as the rest of the patty at the time the top plate 15 comes into full contact with the upper part of the patty. It should be noted that the lower plate 12 has been in contact with lower surface of the patty during the plug penetration period, and while some thawing has begun from the bottom, it is generally inconsequential since the penetration period is relatively short. With the top plate fully contacting the patty, heat emanates from both the top and bottom plates into the patty, progressively thawing and heating it from the outside in. At the same time, heat proceeds from the plug into the reduced portion of the patty. By the time sufficient heat from the plug reaches the wall 36 of cup 35 to affect element 42, the interior of the balance of the patty will have been thoroughly thawed and warmed to the desired temperature. At this moment, element 42 moves downwardly as shown in Figure 8, breaking circuit with contact 43 and completing a circuit through contact 60 with lamp 24 so as to illuminate it. This indicates to the user that the patty has been brought to serving temperature so that he may lift the top plate 15 and remove the patty.

Figure 5:
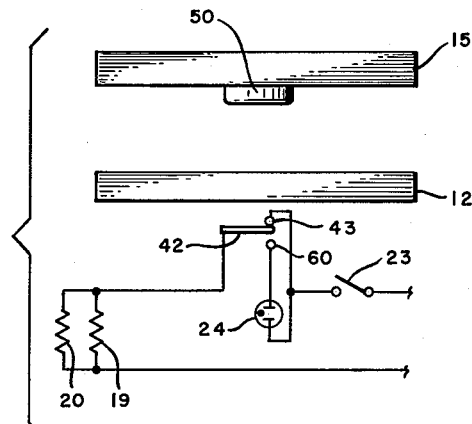

The lamp 24 will continue to glow until the thermostat cools and element 42 moves out of engagement with contact 60 to its original position shown in Figure 5. This cooling process is hastened, of course, when a frozen charge is placed on the lower plate at the beginning of another heating cycle.

Additional controls may be and preferably are provided for maintaining plates 12 and 15 at a safe maximum temperature when heaters 19 and 20 are energized. Such a control may be a separate thermostat responsive to plate temperatures and operating independently of the indicator system described above. Other controls may be included which permit an initial fast build-up of heat in the plates to hasten the thawing action, and thereafter utilize the inertia of this heating action to complete the thawing and warming of the food after power to the heaters has been turned off. Such controls may also be combined with temperature indicating system heretofore described so as to respond to the true temperature of the interior portions of the food charge.

The areas of thermostat assembly 26 and of plug 50 are relatively small in comparison to the total area of the plates 12 and 15. For example, in one grill unit which has been built and successfully operated, the thermostat opening 29 in a bottom plate measuring 5½ inches by 3½ inches had a diameter of 1⅞ inches. The indicator system is therefore compact and readily adaptable to use with grills of various sizes.

Changes in and modifications to the above described embodiment of our invention may be made by one skilled in the art without departing from the precepts of the invention. For example, detector assembly 26 may be made to project upwardly from the top surface of bottom plate 12 while plug surface 51 is flush with the surface 15a of the top plate, see Figure 9, or both the plug 50 and detector assembly may project inwardly from their respective plates by predetermined distances (one-quarter of charge thickness T), see Figure 10. It is intended, therefore, that this invention shall not be limited to the preferred embodiment but that the appended claims shall define the scope of the invention.

We claim:
1. Cooking apparatus comprising first and second heating plates supported for movement toward and away from each other and adapted to engage and heat a slab of food therebetween, heater elements connected in heat exchange relation with said plates for directing heat from said plates inwardly of said food slab, the first plate having an opening therein, a temperature detector assembly mounted in said opening, said assembly comprising a wall portion adapted to engage the food slab, a temperature responsive element adjacent to said wall portion, means for thermally insulating said temperature responsive element from heat produced by said first plate, and an indicator actuated by said temperature responsive element for indicating a predetermined temperature; said second plate having a thermally conductive plug projecting therefrom a predetermined distance toward the first plate, said plug being aligned with said temperature responsive element when said food slab is operationally engaged by both of said plates whereby the spacing between said plug and said wall member is less than the spacing between said plates.

2. Cooking apparatus according to claim 1 in which the distance which said plug projects from the plate is substantially equal to one-half the interplate spacing when the plates fully engage the food slab.

3. Cooking apparatus according to claim 1 in which said plug is formed integrally with said second plate whereby said predetermined projection distance is fixed.

4. Cooking apparatus according to claim 1 in which said plug is adjustably mounted on the second plate whereby the projection distance is variable.

5. Cooking apparatus according to claim 1 in which said plug projects from the plate a distance substantially equal to one-half the mean thickness of the food slab.

6. Food warming apparatus comprising a pair of heat conducting plates arranged to be moved into contact with opposite sides of a slab of food to be heated, heater coils connected in heat conducting relation with said plates for heating same whereby heat is directed from the exterior to the interior of the food slab, means for energizing said heater coils, one of said plates having an opening therein, a shield member of low thermal conductivity mounted within said opening and having a radially inwardly extending annular flange, a retainer cup having an end wall flush with said flange and having retaining fingers extending from said end wall in a direction away from the other of said plates, said cup having high heat conductivity and being secured to the inner edge of said flange, a thermostat assembly removably retained within said cup by said fingers and having a temperature responsive element, indicator means electrically connected to said element for indicating when a temperature of predetermined magnitude has been sensed by said element; the other of said heat conducting plates having a projection extending therefrom a predetermined distance toward said one heat conducting plate, said projection being aligned with the opening in said one plate whereby the thickness of the food slab between the projection and said wall of the retainer cup is less than the thickness of other parts of the food slab.

7. Food warming apparatus comprising a pair of heat conducting plates arranged to be moved into contact with opposite sides of a slab of food to be heated, heater coils for heating said plates whereby heat is directed from the exterior to the interior of the food slab, means for energizing said heater coils, one of said plates having an opening therein, a shield member of low thermal conductivity mounted within said opening and having a radially inwardly extending annular flange, a retainer having a wall flush with said flange, said retainer having high heat conductivity and being secured to the inner edge of said flange, a thermostat assembly mounted within said retainer and having a temperature responsive element, indicator means operatively connected to said element for indicating the temperature at said wall of the retainer; the other of said heat conducting plates having an adjustable heat conducting plug extending therefrom a predetermined distance toward said one heat conducting plate, said plug being aligned with said thermostat assembly whereby the thickness of the food slab between the plug and said wall of the retainer is less than the thickness of other parts of the food slab.

8. In combination with a pair of heating plates having substantially flat surfaces adapted to engage opposite sides of an interposed object to be heated, mechanism for indicating the temperature of the interior of the object comprising plug means projecting from one of said plates into a portion of the object, said surface of a thermally responsive element fixed in the other of said plates in alignment with said plug means and being solely responsive to heat passing through the said portion of the object, and indicating means actuated by said element.

9. Cooking apparatus comprising first and second heating plates supported for movement toward and away from each other and adapted to engage and heat a slab of food therebetween, heater elements connected in heat exchange relation with said plates for directing heat from said plates inwardly of said food slab, thermostatic switch means connected in series with said heater elements for limiting the maximum temperature of said plates, the first plate having an opening therein, a temperature detector assembly mounted in said opening, said assembly comprising a wall portion adapted to engage the food slab, a temperature responsive element adjacent to said wall portion, means for thermally insulating said temperature responsive elements from heat produced by said first plate, and an indicator actuated by said temperature responsive element for indicating a predetermined temperature, said second plate having a projecting part extending therefrom toward the first plate and aligned with said temperature responsive element when said food slab is operationally engaged by both of said plates whereby the spacing between said part and said wall member is less than the spacing between said plates.

References Cited in the file of this patent

UNITED STATES PATENTS

| | | |
|---|---|---|
| 1,984,063 | Graham | Dec. 11, 1934 |
| 2,282,089 | Propernick | May 5, 1942 |
| 2,300,061 | Purpura | Oct. 27, 1942 |
| 2,392,635 | Bletz | Jan. 8, 1946 |
| 2,813,963 | Lennox | Nov. 19, 1957 |
| 2,877,333 | Long et al. | Mar. 10, 1959 |
| 2,888,548 | Knapp | May 26, 1959 |